United States Patent [19]

Gerdes

[11] Patent Number: 5,273,297
[45] Date of Patent: Dec. 28, 1993

[54] LEVELING SYSTEM FOR VEHICLES

[75] Inventor: Manfred Gerdes, Korntal-Muenchingen, Fed. Rep. of Germany

[73] Assignee: Robert Bosch GmbH, Stuttgart, Fed. Rep. of Germany

[21] Appl. No.: 901,066

[22] Filed: Jun. 19, 1992

[30] Foreign Application Priority Data

Jun. 21, 1991 [DE] Fed. Rep. of Germany ....... 4120489

[51] Int. Cl.$^5$ ............................................. B60G 17/08
[52] U.S. Cl. .................................. 280/6.12; 280/714; 137/625.61; 137/625.64
[58] Field of Search ............... 280/714, 840, 6.1, 6.12; 180/41; 188/299; 267/64.16; 137/625.61, 625.64; 91/433

[56] References Cited

U.S. PATENT DOCUMENTS

| | | | |
|---|---|---|---|
| 4,836,511 | 6/1989 | Buma et al. | 280/714 X |
| 4,911,469 | 3/1990 | Kawarasaki | 280/707 |
| 4,911,470 | 3/1990 | Fukunaga | 280/714 X |
| 5,085,460 | 2/1992 | Takahashi | 280/714 X |
| 5,156,645 | 10/1992 | Tsukamoto et al. | 280/714 |
| 5,160,160 | 11/1992 | Kawabata | 280/714 X |

FOREIGN PATENT DOCUMENTS 3910030 10/1989 Fed. Rep. of Germany .

Primary Examiner—Margaret A. Focarino
Assistant Examiner—Peter C. English
Attorney, Agent, or Firm—Edwin E. Greigg; Ronald E. Greigg

[57] ABSTRACT

A leveling system for vehicles has one pressure regulating valve for controlling each work cylinder disposed between the vehicle body and a wheel support, the work cylinder having a hydraulically controlled main valve and an electromagnetically controlled pilot valve. To avoid uncontrolled motion of the vehicle body upon start-up, the pilot valve has a valve piston controlled by an electromagnet and acted upon in the valve closing direction by pressure in the control chamber of the main valve, which chamber communicates with a fluid source via a throttle, and in the valve opening direction by the pressure in the work cylinder. The valve piston has a valve seat, cooperating with a fixed valve member. The valve inlet of the pilot valve communicates with the control chamber, and its valve outlet communicates with a fluid tank. The main valve has three valve positions. One valve connection for the work cylinder is blocked or selectively communicates with the other valve connections for the fluid source and the fluid tank, respectively. A blockable valve device precedes the valve connection for the fluid tank. Both the fluid source and the fluid tank are assigned one further valve device each.

31 Claims, 1 Drawing Sheet

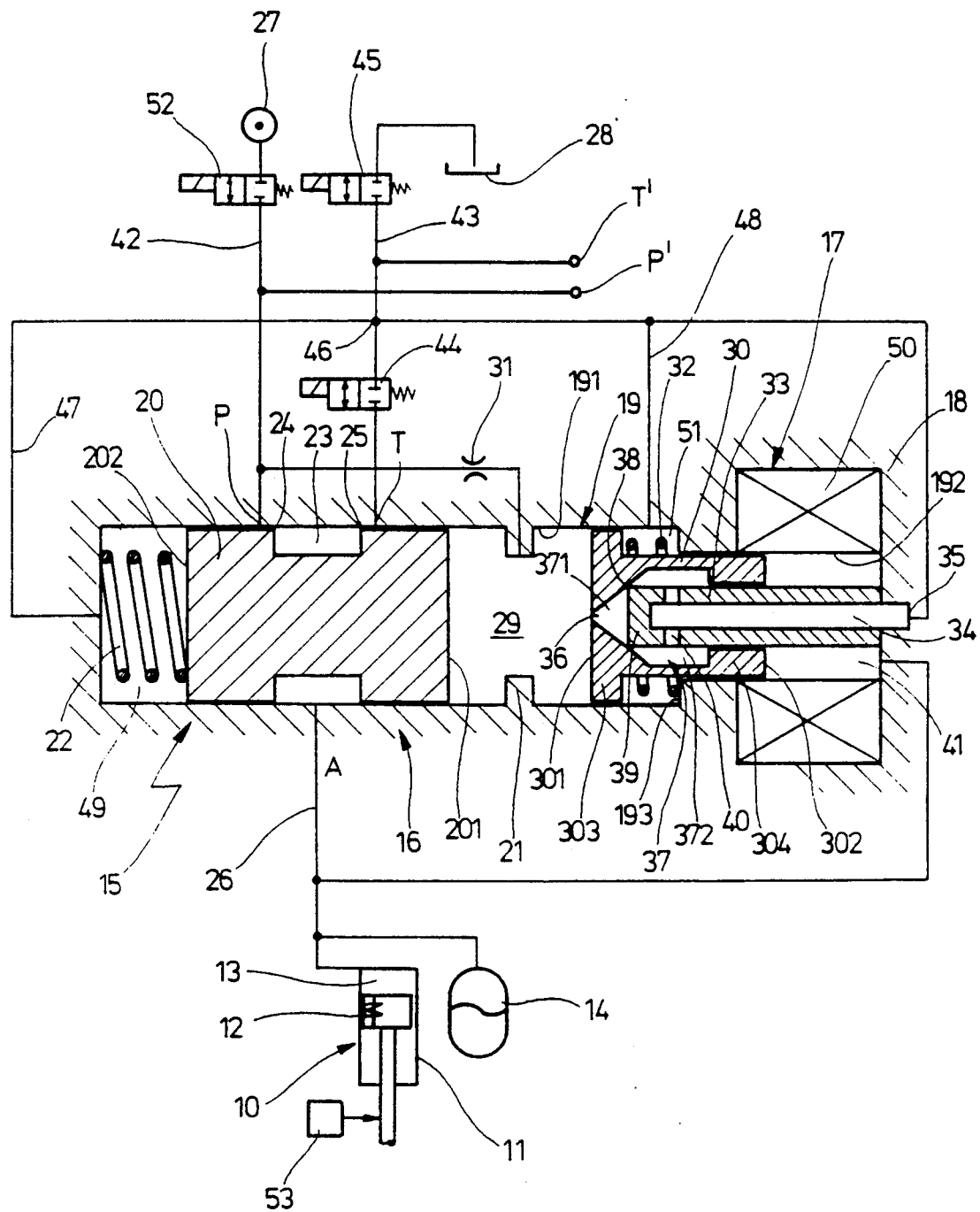

LEVELING SYSTEM FOR VEHICLES

BACKGROUND OF THE INVENTION

The invention is based on a leveling system for vehicles.

In a known leveling system of this type (German Patent Disclosure Document 39 10 030 A1), two restoring springs acting contrary to one another are provided for the control slide; in its uncontrolled state, they keep it in a middle position of its displacement travel, in which all the valve connections are blocked. With its axial end faces, the control slide, on one side, defines the control chamber that communicates with the pilot control valve and is connected via a throttle to the valve connection for the pressure fluid source, and on its other side it defines a pressure chamber, which communicates via a further throttle with the valve connection for the work cylinder or actuator, so that the pressure of the actuator is fed back to the control slide. The valve outlet of the pilot control valve communicates via a throttle with the valve connection for the pressure fluid tank of the main valve. A closing valve is disposed in the return line from the aforementioned valve connection to the pressure fluid tank; it is connected by its control inlet to the connecting line from the pressure fluid source to the main valve. The closing valve is designed such that it is opened as long as the control pressure in the connecting line is greater than a specified value. If the control pressure drops below this value, the closing valve closes. The pressure in the return line upstream of the closing valve rises and then adjusts to the pressure prevailing in the work cylinder. As a result, no pressure fluid pressure in the actuator is bled off. The actuator maintains its pressure, unchanged.

When the vehicle having the known leveling system is started up, pressure surges can occur in the work cylinder as the leveling system begins to operate, and a resultant sudden shift in the vehicle body can endanger passengers.

OBJECT AND SUMMARY OF THE INVENTION

It is a principal object of the invention to provide a leveling system having the advantage over the prior art that when the leveling system goes into operation, a startup procedure that proceeds without any pressure surges in the work cylinder or actuator is assured. The requisite engineering expenditure is relatively slight. For two actuators associated with one vehicle axle, only a total of four further blockable valve devices, in addition to the pressure regulating valves that are each assigned to one actuator, are needed as external circuitry for the two pressure regulating valves; specifically, these are two valve devices associated with the valve connection for the pressure fluid tank of the two main valves, and one valve device each associated with the pressure fluid source and the pressure fluid tank. Constructing the pressure regulating valve is no more expensive or difficult than in the known leveling system.

To put the leveling system into operation, the following valve devices are shifted successively out of their blocking position into their opening position and kept in this switched-over position during operation, in the following order: the valve device connected to the pressure fluid tank, the valve device connected to the pressure fluid source, and the valve device preceding the valve connection for the pressure fluid tank of the main valve. With the switchover of the valve device connected to the pressure fluid source, the controllable electromagnet, preferably embodied as a proportional magnet, of the pilot control valve is supplied with a minimal exciter current, and before a switchover 15 of the valve device preceding the valve connection for the pressure fluid tank, the exciter current for the electromagnet is adjusted such that the control slide of the main valve blocks off the valve connections. As a result of these provisions, the control slide is in its middle position that blocks the valve connections when the last valve device opens, so that no outflow or inflow of pressure fluid to the actuator takes place, and thus its system pressure remains unchanged during the startup process of the leveling system.

In a preferred embodiment of the invention, this adjustment of the exciter current for the electromagnet in the pilot control valve is effected by providing a travel sensor for measuring the spring deflection travel of the work cylinder, for instance the displacement travel of its work piston, and by initially increasing the exciter current for the electromagnet enough that the travel sensor ascertains a spring deflection travel, and then the exciter current is lowered precisely far enough that the measured spring deflection travel is rescinded once again.

In a structurally advantageous embodiment of the invention, the main valve and the pilot valve are embodied in axial succession within a shared valve body, and the valve piston of the pilot valve defines the control chamber of the control slide on its opposite side. Stops are provided in the control chamber, against which stops the control slide of the main valve and the valve piston of the pilot valve rest under the influence of their restoring springs, after mutually contrary displacement motions, when the pressure chamber is pressureless. The valve connections at the main valve are arranged such that the control slide assumes a position such that in it the valve connections for the work cylinder and for the pressure fluid tank communicate with one another at the main cylinder In a preferred embodiment of the invention, the corresponding valve connections of the main valve of a further, identically embodied pressure regulating valve for a further work cylinder are connected to the valve outlet of the valve device associated with the pressure fluid source and to the valve inlet of the valve device associated with the pressure fluid tank. This further work cylinder is assigned to the same vehicle axle. This has the advantage that in the event of a malfunction, in which the valve devices at the pressure fluid tank and the pressure fluid source close suddenly, the pressure in the actuators can be equalized, thereby preventing unstable driving conditions, axle by axle via the connecting line that exists by way of the valve connections for the pressure fluid tank. A throttle function is performed as a result of the leakage from the pressure regulating valve, the leakage sometimes amounting to up to approximately 0.7 to 1 liter per minute.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing shows a basic circuit diagram for a hydraulic leveling system for a vehicle.

DESCRIPTION OF THE PREFERRED EMBODIMENT

The hydraulic leveling system for a vehicle, schematically sketched in the drawing, serves to regulate the height of the vehicle body and the position of the vehicle body by suppressing relative motion between the vehicle body and the wheel supports (partially active suspension). The wheel supports are part of suspension mechanisms disposed at the left and right front and left and right rear, and they rotatably support corresponding wheels. One hydraulic work cylinder or actuator 10 is disposed between the vehicle body and each wheel support; it has a work piston 12 that is axially displaceably guided in a hydraulic cylinder 11 and in the hydraulic cylinder 11 defines a work chamber 13 filled with hydraulic oil or some other fluid. The work chamber 13 is connected to a reservoir 14. To control the pressure in the work chamber 13, a pressure regulating valve 15 is provided, which comprises a hydraulically controlled main valve 16 and a pilot valve 17, which are embodied, axially aligned, in a common valve housing 18 represented by shading in the drawing. The pressure regulating valve 15 is preferably a proportional pressure regulating valve. To this end, a stepped bore 19 that is closed off at both ends is made in the valve housing 18. A control slide 20 is axially displaceably guided in the bore segment 191 having the larger diameter. The displacement travel of the control slide 20 is defined by an annular rib 21 that protrudes radially into the bore segment 191. The control slide 20 can be pressed against this annular rib 21 by the restoring force of a restoring spring 22. The control slide 20 has an annular groove 23 encompassing it on the outside, and one circular control edge 24 and 25 each is formed on the groove flanks; with these control edges, the control slide 20 controls three valve connections A, P, and T, of the main valve 16 by means of axial displacement. Valve connection A is connected to the work chamber 13 of the actuator 10 via a pressure line 26, while valve connection P is intended for connection of a pressure fluid source 27 and valve connection T is intended for connection of a pressure fluid tank 28. The pressure fluid tank 28 is typically embodied by a hydraulic oil container, and the pressure fluid source 27 is embodied by a feed pump that pumps hydraulic oil out of the hydraulic containers. The control slide 20, with its end face 201 remote from the restoring spring 22, together with the end face 301 of a valve piston 30 of the pilot control valve 17, defines a control chamber 29, which communicates via a throttle 31 with the valve connection P for the pressure fluid source 27. The throttle 31 is suitably embodied by a throttle bore. The valve connections A, P, T are designed such, and the control slide 20 is embodied such, that when the control chamber 29 is pressureless and the control slide 20 thus rests on the annular rib 21, the valve connections A and T communicate with one another.

The valve piston 30 of the pilot control valve 17, which is approximately T-shaped in longitudinal section, is axially displaceably guided by its cap part 303 in the bore segment 191 and by its shank part 304 in the bore segment 192 of reduced diameter. A restoring spring 32 which when the control chamber 29 is pressureless presses the valve piston 30 against the annular rib 21, is supported on the shoulder 193 formed at the transition between the bore segments 191 and 192 and on the cap part 303 of the valve piston 30. The valve piston 30 slides in a substantially pressure-tight manner on a valve rod 33, which has a central blind bore 34 that discharges into the valve outlet 35 of the pilot valve 17. The valve piston 30 has a valve chamber 37, which is subdivided into a front and a rear chamber segment 371, 372 by a valve seat 38 that is formed on a conical face in the valve chamber 37 and cooperates with a valve member 39 embodied on the free end of the valve rod 33. By the cooperation of the valve piston 30 with the spatially fixed valve member 39 of the pilot valve 17, a controllable valve opening is produced. The front chamber segment 371 communicates with the control chamber 29 of the main valve 16 via a central opening, forming the valve inlet 36, in the end face 301 of the valve piston 30, while the rear chamber segment 372 communicates with the valve outlet 35, via radial bores 40 in the valve rod 33 that discharge into the blind bore 34 of the valve rod 33. The annular end face 302 of the valve piston 30, remote from the end face 301, defines a control chamber 41, which communicates with the valve connection A for the actuator of the main valve 16, so that the operating pressure fed into the work chamber 13 of the actuator 10 at any given time is present in the control chamber 41. The connecting line is suitably embodied as a bore in the valve housing 18. The valve piston 30 is controlled by an electromagnet 50, preferably a proportional magnet which is symbolically indicated by its exciter winding. The exciter current for the electromagnet 50 is furnished by a control unit (not shown), which in turn communicates with a number of vehicle height meters and with acceleration sensors for transverse and longitudinal acceleration, which taken all in all provide the control unit with accurate parameters on the vehicle driving condition.

The pressure fluid source 27 communicates via a pressure supply line 42 with the valve connection P of the main valve 16, and the pressure fluid tank 28 communicates via a return line 43 with the valve connection T of the main valve 16. Two valve devices 44, 45 are disposed in succession in the return line 43. The valve outlet 35 of the pilot valve 17 is connected to the connecting point 46 between the two valve devices 44, 45. Two oil lines 47, 48 also lead to this point and discharge respectively into the spring chamber 49 that receives the restoring spring 22 and is defined by the end face 202 of the control slide 20 and into the chamber segment 51 that receives the restoring spring 32 and is enclosed by the shoulder 193 in the bore 19 and the cap part 303 of the valve piston 30. A further valve device 52 is disposed in the pressure supply line 42. A further pressure regulating valve, not shown here, for controlling a further actuator that together with the actuator 10 is assigned to the same vehicle axle is connected to the connecting point 46 between the two valve devices 44, 45 and to the outlet of the valve device 52. The corresponding valve connections of the main valve of this further pressure regulating valve are indicated a P' and T' in the drawing.

The valve devices 44, 45, 52 assume their blocking position in their uncontrolled basic position, and they are switched over to their open position by the control unit, not shown. A so-called startup routine is specified in the control unit, by means of which routine the valve device 45 is actuated first, then the valve device 52, and finally the valve device 44. Upon the actuation of the valve device 52, the electromagnet 50 of the pilot valve 17 is simultaneously supplied with minimal exciter current. This exciter current is increased slowly, until the control slide 20, before the last valve device 44 is triggered, is in the middle position shown in the drawing, in which the three valve connections A, P and T are blocked. This kind of adjustment of the exciter current is brought about in such a way that the displacement travel of the work piston 12, that is, the so-called spring deflection travel of the actuator 10, is measured with a travel sensor 53. The exciter current is initially increased to such an extent that the travel sensor 53 ascertains a displacement travel, and then is lowered precisely far enough that this ascertained displacement travel is precisely rescinded. During operation, the valve devices 44, 45, 52 are kept in their open position. In the event of a malfunction, the valve devices 44, 45 and 52 are put in the closing position.

The mode of operation of the leveling system described above is as follows:

When the motor vehicle is put into operation, the startup routine is first run. The valve device 45 opens, and the valve outlet 35 of the pilot valve 17 communicates with the pressure fluid tank 28. Regardless of the pressure conditions, the valve piston 30 rests on the annular rib 21, by the force of its restoring spring 32. The pilot valve 17 is opened, and the control chamber 29 is pressureless as a result. By the influence of its restoring spring 22 the control slide 20 of the main valve 16 thus likewise rests on the annular rib 21. In this position of the control slide 20, although the valve connections A and T communicate with one another, nevertheless no outflow of pressure fluid from the actuator 10 occurs because of the valve device 44 that is in the blocking position. Actuator pressure is likewise present in the control chamber 41 of the pilot valve 17.

The valve device 52 is now reversed. The control chamber 29 is acted upon gradually with pressure, via the throttle 31. All the forces that also act upon the valve piston 30 of the pilot valve 17 in the operating mode now act upon that valve piston 30. At the same time, the electromagnet 50 is triggered, but its magnet force is kept as low as possible. As a function of the pressure developing in the control chamber 29, the control slide 20 adjusts to the pressure of the actuator 10 and to the magnet force; that is, because of the minimal magnet force, the control slide 20 remains in its position shifted to the right, in which the valve connections A and T communicate with one another.

The magnet force is now gradually increased. As a result, the throttle cross section of the valve opening between the valve member 39 and the valve seat 38 in the pilot valve 17 becomes smaller, and as a result the pressure in the control chamber 29 rises, and the control slide 20 is moved gradually counter to the restoring spring 22. Once the control slide 20 reaches its position on the left, a communication between the valve connections P and A is established via the control edge 24. This also increases the pressure in the actuator 10, because of the now-flowing hydraulic oil stream. Once this pressure is high enough to counteract the weight of the vehicle body, the work piston 12 begins to be displaced in the hydraulic cylinder 11, and an upward motion is imparted to the vehicle body. The displacement motion of the work piston 12 is detected by the travel sensor 53 and reported to the control unit. The exciter current for the electromagnet 50 is now reduced until this measured spring deflection travel is precisely rescinded. The pressure in the control chamber 29 in turn decreases enough that the control slide 20 assumes its middle position, shown in the drawing, in which it blocks off all three valve connections A, P, and T. The valve device 44 is now reversed to its open position. This switchover process causes no change whatever in the pressure regulating valve 15.

Now the normal regulating process is carried out during operation. For instance, if the pressure in the actuator 10 rises from external influences, then the valve piston 30 of the pilot valve 17 is displaced in the direction of the control slide 20, or in other words on the left as viewed in the drawing. As a result, a larger cross section of the valve opening is uncovered by the pilot valve 17, and as a result the hydraulic oil stream out of the control chamber 29 via the pilot valve 17 increases. As a result, the pressure in the control chamber 29 drops. This in turn causes a displacement of the control slide 20 to the right as viewed in the drawing. The valve connection T is uncovered by the control edge 25 of the control slide 20, and as a result the pressure in the actuator 10 drops.

Conversely, if the pressure in the actuator 10 decreases from external influences, then the valve piston 30 of the pilot valve 17 is shifted to the right as viewed in the drawing, as a result of the likewise-dropping pressure in the control chamber 41. The hydraulic oil stream via the valve opening of the pilot valve 17 is throttled, and as a result the pressure in the control chamber 29 is increased because of the quantity of hydraulic oil flowing into it via the throttle 31. The control chamber 20 is displaced counter to the restoring spring 22, and the control edge 24 of the control slide 20 uncovers the valve connection P. Hydraulic oil thus flows via the valve connection A into the actuator 10, where it raises the actuator pressure.

Once any equalization processes upon a pressure increase or reduction in the actuator 10 are completed, a state of equilibrium comes about between the pressure forces and spring forces. The result is a state of equilibrium for the inflowing and outflowing quantity of hydraulic oil, so that the overall system is stable.

In the event of a malfunction, the two valve devices 45, 52 are turned off and close immediately. Via the leakage of the pilot valve 17 and of the main valve 16, the actuator pressure is present at the valve connection T of the main valve 16 within a short time. Via the connection T' for the second pressure regulating valve of the same axle, the pressure in the actuators 10 of the same axle are thus equalized axle by axle; because of the limited leakage, a throttle function is performed. If over a relatively long time it is found that the spring deflection travel in the two actuators 10 approach one another, then the valve device 44 is de-excited, and it closes. The vehicle is brought to a level state and in that state can thus be operated passively, without unstable driving conditions.

The invention is not limited to the exemplary embodiment of the leveling system described here. For instance, instead of hydraulic oil or some other fluid, compressed air may also be used as the pressure fluid. The valve device 44, 45 and 52 may be embodied either as multiposition valves, such as longitudinal slide valves, longitudinal flat-bodied slide valves or parallel slide gate valves, or as seat valves, such as piston seat valves, flat-body seat valves, or the like. The valve devices 44, 45, 52 may be independent, separately electromagnetically actuatable valves. It is also possible to combine the valve devices 44, 45, 52 in a single valve housing. The valve devices 44, 45, 52 may be embodied as a single valve, for instance with only one actuatable valve slide; by actuation of this one valve slide, then the corresponding connections of the valve devices 44, 45, 52 can be closed or opened in the manner indicated and in the order given in the exemplary embodiment. The pilot valve 17 likewise need not be a seat valve. However, seat valves have the advantage of a simpler construction and greater tightness against leakage. The pilot valve 17 may for instance be embodied as a multiposition valve.

In addition to the function explained in conjunction with the exemplary embodiment shown, the actuator 10 can additionally be extended or retracted as desired, arbitrarily, with the aid of the leveling system; that is, the height of the vehicle body can be varied as needed. With the aid of the travel sensor 53, for instance, the height of the body can be measured. Depending upon the current to the electromagnet 50, the lowering or raising of the body can be done as desired, arbitrarily. A higher current to the electromagnet 50 represents an extension of the actuator 10, thus raising the vehicle body, while a reduction in the current to the electromagnet 50 represents a lowering of the vehicle body. This leveling control of the vehicle body can in principle be assigned a higher rank than the functions described in conjunction with the exemplary embodiment shown.

The electromagnet 50 is preferably embodied as a proportional magnet, and the pilot valve 17 is preferably a proportional valve.

In the position of repose, a state of equilibrium is established between the pressure forces and spring forces in the leveling system. The result is a state of equilibrium for the inflowing and outflowing streams of pressure fluid; the system is stable.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A leveling system for vehicles having at least one pressure-fluid-actuated work cylinder (10) disposed between a vehicle body and a wheel support, said leveling system having a pressure fluid source (27) and a pressure fluid tank (28) respectively for supplying pressure fluid to and receiving pressure fluid from the work cylinder, and further having a pressure regulating valve (15) for controlling a flow of pressure fluid to and from the work cylinder, said pressure regulating valve including a main valve (16) with at least first, second, and third valve connections (A, P, T), the first valve connection (A) for connection to the work cylinder (10), the second valve connection (P) for connection to the pressure fluid source (27), and the third valve connection (T) for connection to the pressure fluid tank (28), respectively, further including a pressure-fluid-actuated control slide (20) for controlling the at least first, second, and third valve connections and a pilot valve (17), actuated by an electromagnet (50), said pilot valve provided with a controllable valve opening (38), said pilot valve being disposed between a valve inlet (36) and a valve outlet (35) for selectively controlling the control slide counter to a force of a first restoring spring (22) into at least first, second, and third slide positions, in said first slide position the work cylinder is blocked off, in said second slide position the work cylinder communicates with the pressure fluid source, and in said third slide position the work cylinder communicates with the pressure fluid tank, said control slide defining a control chamber (29) that communicates on one side via a throttle (31) with the second valve connection (P) for the pressure fluid source and on the other side with the valve inlet (36) of the pilot valve, the valve outlet (35) of said pilot valve being located at the pressure fluid tank, the controllable valve opening (38) being embodied in the cooperation between a valve piston (30) actuated by the electromagnet (50) and a spatially fixed valve member (39) of the pilot valve (17), the valve piston (30) being acted upon on one side in the valve opening direction by a first pressure prevailing at the first valve connection (A) for the work cylinder (10) and in the valve closing direction by a second pressure prevailing in the control chamber (29) of the main valve (16), a first control valve device (44) having a fourth valve connection (46) leading to the pressure fluid tank (28) precedes the third valve connection (T), wherein the valve outlet (35) communicates with the fourth valve connection (46), and a second control valve device (52) is provided between the pressure fluid source (27) and the second valve connection (P) of the main valve (16) and a third valve control device (45) is provided between the pressure fluid tank (28) and the fourth valve connection (46) leading to the first control valve device (44).

2. A system as defined by claim 1, in which for startup operation, the third control valve device (45) connected to the pressure fluid tank (28), the second control valve device (52) connected to the pressure fluid source (27), and the first control valve device (44) preceding the third valve connection (T) of the main valve (16) for the pressure fluid tank (28) are switched over from a blocking position to an open position, in a successive order.

3. A system as defined in claim 2, in which upon a switchover of the second control valve device (52) connected to the pressure fluid source (27), the electromagnet (50) of the pilot valve (17) is supplied with minimal exciter current from a current source.

4. A system as defined by claim 3, in which prior to the switchover of the first control valve device (44) preceding the third valve connection (T) for the pressure fluid tank (28) of the main valve (16), an exciter current for the electromagnet (50) of the pilot valve (17) is adjusted to allow the control slide (20) of the main valve (16) to block off all said first, second, and third valve connections (A, P, T). until the travel sensor (53) measures a spring deflection travel; and then the exciter current for the electromagnet (50) is decreased precisely far enough that the measured spring deflection travel of the work cylinder (10) is rescinded again.

5. A system as defined by claim 4, in which a travel sensor (53) is provided for measuring a spring deflection travel of the work cylinder (10); the exciter current for the electromagnet (50) of the pilot valve (17) is increased until the travel sensor (53) measures a spring deflection travel; and then the exciter current for the electromagnet (50) is decreased precisely far enough that the measured spring deflection travel of the work cylinder (10) is rescinded again.

6. A system as defined by claim 3, in which the first, third, and second control valve devices (44, 45, 52) comprise magnet valves.

7. A system as defined by claim 6, in which the first, third, and second magnet valves (44, 45, 52) are arranged to exert a blocking action in their unexcited basic position.

8. A system as defined by claim 3, in which the valve piston (30) of the pilot valve (17) is pre-loaded by a second restoring spring (32) that acts in the valve opening direction.

9. A system as defined by claim 3, in which the main valve (16) and pilot valve (17) are disposed axially one behind the other in a shared valve housing (18), and the valve piston (30) of the pilot valve (17), on a side toward said main valve defines the control chamber (29) of the main valve (16).

10. A system as defined by claim 9, in which stops (21) for the control slide (20) and valve piston (30) are provided in the control chamber (29) of the main valve (16), against which stops the control slide and the valve piston are pressed by the first and a second restoring spring (22, 32) when the control chamber (29) is pressureless.

11. A system as defined by claim 2, in which prior to the switchover of the first control valve device (44) preceding the third valve connection (T) for the pressure fluid tank (28) of the main valve (16), an exciter current for the electromagnet (50) of the pilot valve (17) is adjusted to allow the control slide (20) of the main valve (16) to block off said first, second, and third valve connections (A, P, T).

12. A system as defined by claim 11, in which a travel sensor (53) is provided for measuring a spring deflection travel of the work cylinder (10); the exciter current for the electromagnet (50) of the pilot valve (17) is increased until the travel sensor (53) measures a spring deflection travel; and then the exciter current for the electromagnet (50) is decreased precisely far enough that the measured spring deflection travel of the work cylinder (10) is rescinded again.

13. A system as defined in claim 12, in which the first, third, and second control valve devices (44, 45, 52) comprise magnet valves.

14. A system as defined by claim 13, in which the first, third, and second magnet valves (44, 45, 52) are arranged to exert a blocking action in their unexcited basic position.

15. A system as defined by claim 11, in which the first, third, and second control valve devices (44, 45, 52) comprise magnet valves.

16. A system as defined by claim 15, in which the first, third, and second magnet valves (44, 45, 52) are arranged to exert a blocking action in their unexcited basic position.

17. A system as defined by claim 2, in which the first, third, and second control valve devices (44, 45, 52) comprise magnet valves.

18. A system as defined by claim 17, in which the first, third, and second magnet valves (44, 45, 52) are arranged to exert a blocking action in their unexcited basic position.

19. A system as defined by claim 2, in which the valve piston (30) of the pilot valve (17) is pre-loaded by a second restoring spring (32) that acts in the valve opening direction.

20. A system as defined in claim 2, in which the main valve (16) and pilot valve (17) are disposed axially one behind the other in a shared valve housing (18), and the valve piston (30) of the pilot valve (17), on a side toward said main valve defines the control chamber (29) of the main valve (16).

21. A system as defined by claim 20, in which stops (21) for the control slide (20) and valve piston (30) are provided in the control chamber (29) of the main valve (16), against which stops the control slide and the valve piston are pressed by the first and a second restoring spring (22, 32) when the control chamber (29) is pressureless.

22. A system as defined in claim 1, in which the first, third, and second control valve devices (44, 45, 52) comprise magnet valves.

23. A system as defined in claim 22, in which the first, third, and second magnet valves (44, 45, 52) are arranged to exert a blocking action in their unexcited basic position.

24. A system as defined by claim 1, in which the valve piston (30) of the pilot valve (17) is pre-loaded by a second restoring spring (32) that acts in the valve opening direction.

25. A system as defined by claim 1, in which the main valve (16) and pilot valve (17) are disposed axially one behind the other in a shared valve housing (18), and the valve piston (30) of the pilot valve (17), on a side toward said main valve defines the control chamber (29) of the main valve (16).

26. A system as defined by claim 25, in which stops (21) for the control slide (20) and valve piston (30) are provided in the control chamber (29) of the main valve (16), against which stops the control slide and the valve piston are pressed by the first and a second restoring spring (22, 32) when the control chamber (29) is pressureless.

27. A system as defined by claim 1, in which the first, second, and third valve connections (A, P, T) disposed in the main valve (16) are arranged to allow the first and third valve connections (A, T), respectively for the work cylinder (10) and the pressure fluid tank (28), to communicate with one another when the control chamber (29) is pressureless.

28. A system as defined by claim 1, in which at a valve outlet (42) of the second control valve device (52) assigned to the pressure fluid source (27) and at a valve inlet (46) of the third control valve device (45) assigned to the pressure fluid tank (28), corresponding fourth and fifth valve connections (P', T') of a main valve of a further, identically embodied pressure regulating valve for a further work cylinder are connected, and said further work cylinder is associated with a same vehicle axle as the work cylinder (10).

29. A system as defined by claim 1, in which the first, third, and second control valve devices (44, 45, 52) comprise seat valves.

30. A system as defined by claim 1, in which the electromagnet of the pilot valve (17) comprises a proportional magnet (50).

31. A system as defined by claim 1, in which the pilot valve (17) comprises a seat valve whose valve seat (38), provided on the valve piston (30), forms a control edge and is disposed coaxially to the valve member (39) on which is provided another control edge, and the valve opening is formed between the two control edges.

* * * * *